United States Patent [19]
Schouten

[11] Patent Number: 5,791,236
[45] Date of Patent: Aug. 11, 1998

[54] SYSTEM FOR CONTROLLING THE AIR COMPOSITION WITHIN A STORAGE ROOM FOR BREATHING VEGETABLE PRODUCTS

[75] Inventor: Simon Petrus Schouten, Ommeren, Netherlands

[73] Assignee: Instituut voor Agrotechnologisch Onderzoek (ATO-DLO), Wageningen, Netherlands

[21] Appl. No.: 849,670

[22] PCT Filed: Dec. 13, 1995

[86] PCT No.: PCT/NL95/00420

§ 371 Date: Jun. 11, 1997

§ 102(e) Date: Jun. 11, 1997

[87] PCT Pub. No.: WO96/18306

PCT Pub. Date: Jun. 20, 1996

[30] Foreign Application Priority Data

Dec. 13, 1994 [NL] Netherlands ............. 9402111

[51] Int. Cl.⁶ ............. A23B 7/148; A23B 7/152
[52] U.S. Cl. ............. 99/468; 99/470; 99/486
[58] Field of Search ............. 99/468–476, 485–487, 99/325–331, 534, 493, 276, 451; 435/289–291, 313, 316; 426/49, 52, 615

[56] References Cited

U.S. PATENT DOCUMENTS

| | | |
|---|---|---|
| 4,240,721 | 12/1980 | Yun . |
| 5,142,969 | 9/1992 | Chun ............. 435/289.1 X |
| 5,163,360 | 11/1992 | Petz ............. 99/468 |
| 5,204,262 | 4/1993 | Meiering et al. . |
| 5,351,745 | 10/1994 | Park ............. 99/483 X |
| 5,355,781 | 10/1994 | Liston et al. ............. 426/419 X |
| 5,457,963 | 10/1995 | Cahill-O'Brien et al. ............. 422/40 X |
| 5,515,693 | 5/1996 | Cahill-O'Brien et al. ............. 99/468 X |
| 5,623,105 | 4/1997 | Liston et al. ............. 426/418 X |

FOREIGN PATENT DOCUMENTS

| | | |
|---|---|---|
| 0 052 890 | 6/1982 | European Pat. Off. . |
| 0 357 949 | 3/1990 | European Pat. Off. . |
| 0 457 431 | 11/1991 | European Pat. Off. . |
| 43 02 474 | 8/1994 | Germany . |
| 57-144097 | 9/1982 | Japan . |
| 3065176 | 3/1991 | Japan . |
| 4158739 | 6/1992 | Japan . |

Primary Examiner—Timothy F. Simone
Attorney, Agent, or Firm—Young & Thompson

[57] ABSTRACT

System for controlling the air composition within a storage room for breathing vegetable products. The storage room is connected to elements for controlling the oxygen content of the atmosphere in the storage room and comprises one or more sensors for sensing the air composition in the storage room. A processor is available for receiving the sensor signals and supplying control signals to oxygen content controlling elements. Furthermore the storage room comprises sensors for determining the development of metabolites in the vegetable products at the transfer of normal breathing to fermentation. The processor based on the signals, delivered by the sensors, controls the oxygen content controlling elements such that the vegetable products are stored in an air composition in which the oxygen contents is as low as possible without fermentation occurring.

5 Claims, 2 Drawing Sheets

# SYSTEM FOR CONTROLLING THE AIR COMPOSITION WITHIN A STORAGE ROOM FOR BREATHING VEGETABLE PRODUCTS

FIELD OF THE INVENTION

The invention relates in general to a system for controlling the air composition within a storage room for breathing vegetable products which storage room is connected to means for controlling the oxygen contents of the atmosphere in the storage room and which storage room comprises one or more sensors for sensing the air composition in the storage room, whereby furthermore a processor is available for receiving the sensor signals and supplying control signals to oxygen contents controlling means.

BACKGROUND OF THE INVENTION

Such systems are as such known from the prior art e.g. from EP 0 457 431. To store vegetables, fruits or cultivated plant products during a longer time period within a storage cell it is preferred to change the air composition within the storage cell to obtain an improvement of the storage life of the stored products. In general especially the carbon dioxide pressure is increased whereas the oxygen pressure is decreased. Periodically air samples are taken and analyzed to measure especially the oxygen contents and/or the carbon dioxide contents. If the oxygen pressure is too high then said oxygen pressure can be decreased for instance by introducing nitrogen. The carbon dioxide tension can be decreased for instance by guiding a part of the air in the storage room through means for removing $CO_2$ from said air. Dependent on the type of products which have to be stored in the prior art systems the oxygen pressure is set to an experimentally determined fixed percentage and the desired air composition can be maintained by introducing the nitrogen and/or by introducing or removing carbon dioxide.

A significant disadvantage or this prior art system is that in fact the whole air composition control is based on a preselected empirically determined nominal value for the oxygen tension. However, said predetermined fixed value should not be the most optimum value under all circumstances. Furthermore said parameter will be different dependent on the type of vegetables or fruits which have to be stored in the respective room.

SUMMARY OF THE INVENTION

An object of the invention is now to indicate in which way the air composition can be controlled such that the oxygen tension is always near its optimum value whereby the normal breathing of the vegetables, fruits or cultivated plant products is as low as possible without the occurring of fermentation.

A further object of the invention is to indicate in which way the system can be embodied such that independent of the type of products to be stored an optimum control of the air composition is obtained.

These objects are fulfilled in a system as described in the first paragraph, in that the storage room comprises sensors for determining the development of metabolites in the vegetable products at the transfer of normal breathing to fermentation and that the processor based on the signals, delivered by said sensors, controls the oxygen content controlling means such that the vegetable products are stored in an air composition in which the oxygen contents is as low as possible without fermentation occurring.

A preferred embodiment of the system according to the invention is characterized in that the storage room comprises sensors for measuring the oxygen content and the carbon dioxide content in the atmosphere within the storage room, that based on the varying values measured by said sensors the processor determines regularly the ratio between the carbon dioxide produced by the vegetable products and the consumed oxygen, and that the processor operates such that the oxygen contents in the storage room is decreased as long as the calculated ratio is approximately equal to 1, and the oxygen contents is increased in case the calculated ratio is larger than 1. In this embodiment the development of metabolites is measured indirectly by determining the ratio between the produced carbon dioxide and the consumed oxygen. At normal breathing this ratio is approximately equal to 1 because in general the amount of produced carbon dioxide is equal to the amount of consumed oxygen. A decrease of the oxygen tension has hardly any influence on this ratio until the point where fermentation starts. As soon as the oxygen tension is so low that fermentation starts the ratio shows an abrupt strong increase. If this situation occurs then the oxygen tension has to be increased. In other words, the system controls the oxygen tension to a low value whereby a setting is obtained near the bending point in the graph which is characterizing the ratio between the produced carbon dioxide and the consumed oxygen.

In an other embodiment of the system either the ethanol present in the air or the lactate present in the air is directly measured.

A first embodiment in which this is applied is characterized in that the storage room comprises a sensor for measuring the amount of ethanol in the air composition, whereby the processor operates such that the oxygen contents in the storage room is decreased as long as the measured amount of ethanol in the air composition is negligibly small and the oxygen contents is increased in case the measured amount of ethanol exceeds a predetermined small threshold value.

Another embodiment in which the principle of directly measuring is applied is characterized in that the storage room comprises a sensor for measuring the amount of lactate in the air composition, whereby the processor operates such that the oxygen contents in the storage room is decreased as long as the measured amount of lactate in the air composition is negligibly small and the oxygen contents is increased in case the measured amount of lactate exceeds a predetermined small threshold value.

It is especially preferred that the storage room comprises furthermore a sensor for measuring the oxygen contents of the air in the storage room and that after determining a measurable amount of metabolite (such as ethanol or lactate) the therewith corresponding measurement value of the oxygen contents sensor is increased with a predetermined small amount to obtain a control value for controlling the oxygen content control means.

BRIEF DESCRIPTION OF THE DRAWINGS

The invention will be discussed in more detail with reference to the attached drawings, in which.

DETAILED DESCRIPTION OF THE INVENTION

Figure 1:
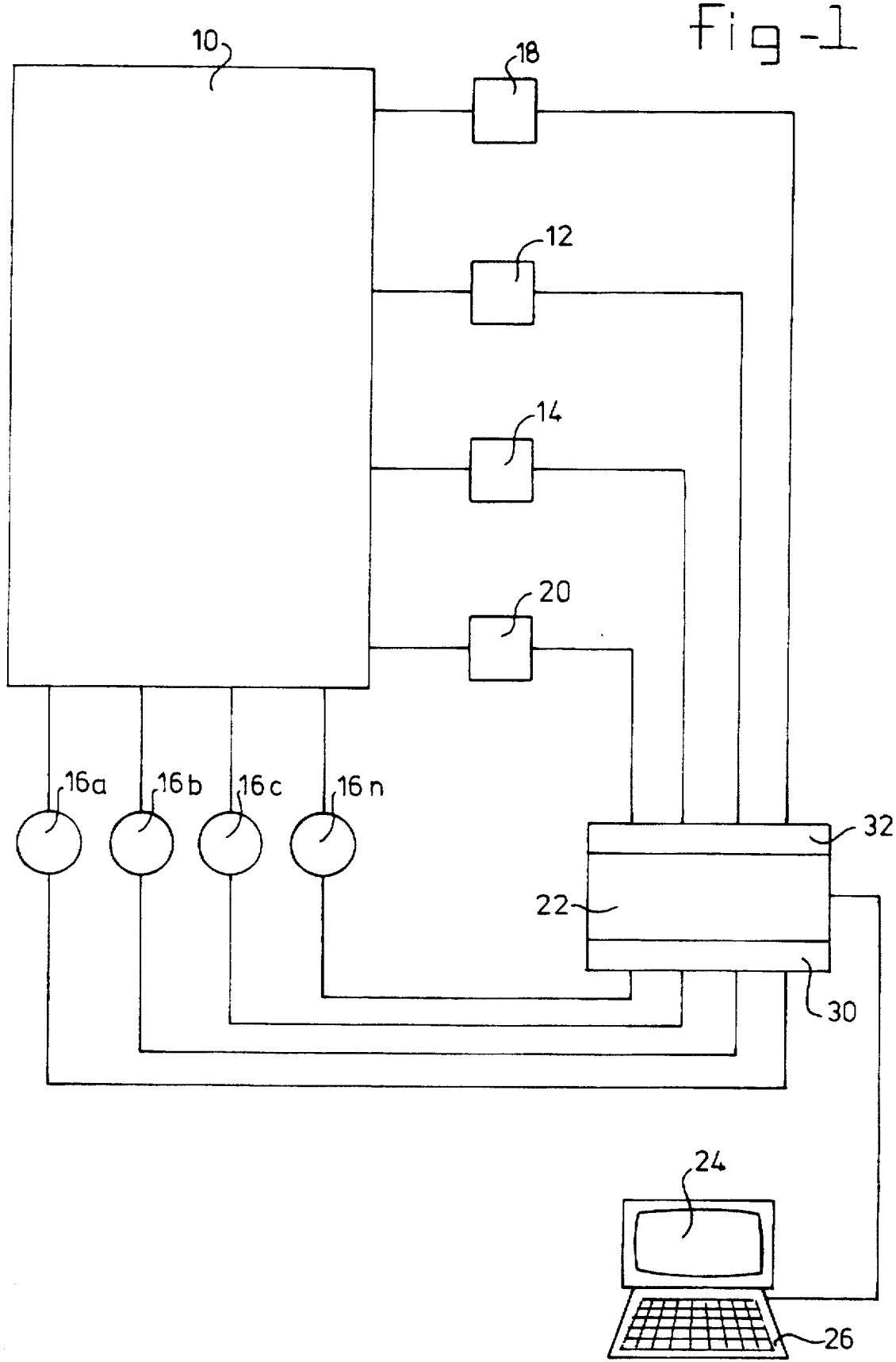
FIG. 1 shows a schematic illustration of a system according to the invention.

FIG. 1 illustrates in the form of a block diagram a system according to the invention, comprising a storage room 10, a nitrogen source 12, an apparatus 14 for removing carbon dioxide from respectively adding carbon dioxide to the air within the storage room 10, as well as a number of sensors 16a ... 16n for measuring the constituting components of the air within the storage room 10.

Each of the sensors 16a ... 16n supplies a signal to an input circuit 30 of the processor 22. Furthermore said processor 22 is through control outputs 32 connected to a nitrogen source 12, to carbon dioxide removing means 14, to an oxygen source 18 and to a carbon dioxide source 20. Furthermore the processor 22 preferably comprises a connection to a display pannel 24 for displaying the significant parameters of the process to the user. Furthermore the processor 22 preferably comprises a further connection to an input unit 26, for instance embodied as a keyboard, through which the user may influence the process which is carried out inside the processor 22.

The storage room 10 can be used for storing breathing vegetable products which includes in a very broad sense vegetables, fruits and cultivated plant products such as flowers, but also products comprising fungi or bacteria, such as cheeses. For storing all these products from a chemical view point two processes are playing a significant role, i.e.

(1) the normal breathing, whereby glucose in the vegetables or fruits to be stored in combination with oxygen from the air is converted into carbon dioxide, water and energy. This normal breathing can be characterized by the very global chemical formula

(2) fermentation whereby glucose in the products to be stored is converted into carbon dioxide, ethanol and energy. The condition in which fermentation occurs can be characterized by the global chemical formula

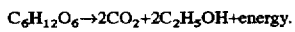

During the storage of breathing vegetable products such as vegetables, fruits or cultivated plant products one tries in general to prevent the occurrence of fermentation. As long as there is sufficient oxygen in the air there will be (practically) exclusively normal breathing. Under the influence of this normal breathing however the ripening processes will continue and the products will "age" relatively fast which is undesirable.

If however on the other hand the oxygen contents is reduced to zero then only fermentation will occur. Under the influence of fermentation the consistency of the stored products will change relatively fast which is also undesirable.

To be able to store breathing vegetable products over a longer time period on the one hand the occurrence of fermentation should be avoided in general whereas on the other hand the breathing should be reduced significantly. To reduce the breathing the oxygen content in the storage room should be decreased so that out of necessity the breathing will be significantly decreased. In a condition with strongly reduced breathing also the "ageing" will be reduced so that the products can be stored over a relatively long period. The decrease of the oxygen tension however has the risk that at too low an oxygen tension a fermentation process will start which has to be avoided.

The system, which is schematically illustrated in FIG. 1, therefore has to operate such that the oxygen tension will be maintained as low as possible however without fermentation occurring. On the one hand the system comprises for that purpose sensors for measuring the momentaneous air composition and on the other hand the system comprises means for influencing the composition of the air.

For measuring the air composition the already mentioned sensors 16a ... 16n are incorporated for determining a number of components in the air composition. Preferably there are at least sensors for measuring the carbon dioxide tension (for instance 16a) and for measuring the oxygen pressure (for instance 16b). Therewith it is possible to determine the occurrence of metabolites such as ethanol and lactate in the storage room in an indirect manner. As long as there is only normal breathing the ratio between the $CO_2$ produced by the stored product divided by the $O_2$ consumed by said product will be approximately equal to 1. (Reference is made to the previously presented chemical formula for the normal breathing). If the oxygen pressure in the storage room is decreased, then the stored product will consume less $O_2$, however simultaneously it will also produce less $CO_2$. The relation between the produced $CO_2$ and the consumed $O_2$ will remain approximately equal to 1. However, if the oxygen pressure in the storage room is decreased too far then fermentation will occur whereby no $O_2$ will be consumed but still $CO_2$ will be produced (Reference is made to the previously presented global formula for the situation in which fermentation occurs). Therefore, if fermentation occurs then the ratio between the produced $CO_2$ and the consumed $O_2$ will increase and will grow significantly larger than 1.

As result of a fermentation process for instance ethanol will be released which can be measured directly by one of the sensors 16. Furthermore lactate will be released which also can be measured directly by one of the sensors. Another substance which is released during fermentation is ethyl acetate and also for that substance suitable sensors are known and available. Depending on the type of the product to be stored the most suitable sensor can be selected. However, the system can also be embodied such that a number of sensors is used each providing an own indication for the occurrence of fermentation. In this respect a further developed embodiment will be described hereinafter.

For influencing the air composition in the storage room 10 a number of already mentioned means are present. To be able to influence the oxygen pressure the system according to FIG. 1 makes use of a nitrogen source 12 for introducing nitrogen in the storage room 10. By introducing nitrogen the oxygen pressure is decreased. If it is necessary to increase the oxygen pressure eventually an oxygen source 18 can be connected to the storage room.

In general it is furthermore desirable to be able to control the carbon dioxide pressure. The carbon dioxide pressure can be decreased by means of the means 14, which is able to remove carbon dioxide from the air. Eventually a separate $CO_2$-source 20 can be used to introduce carbon dioxide in the air.

The processor 22 in the system according to the invention can be programmed such that initially the $O_2$-content in the storage room 10 is decreased whereby regularly the ratio between the produced $CO_2$ and the consumed $O_2$ is calculated. As long as the calculated ratio is approximately equal to 1 the decrease of the oxygen contents will continue. At a decrease of the oxygen contents beyond the (unknown) limit value of a % the calculated ratio will show a sharp rise. As soon as said rise is detected the $O_2$-content is not further decreased but in stead thereof a bit of oxygen is introduced into the room, to obtain a small increase in the $O_2$-content. If thereby a situation is obtained in which the calculated ratio again is approximately equal to 1, then thereafter the oxygen content can be decreased until a rise in the calculation ratio is detected, etc.

Figure 2:
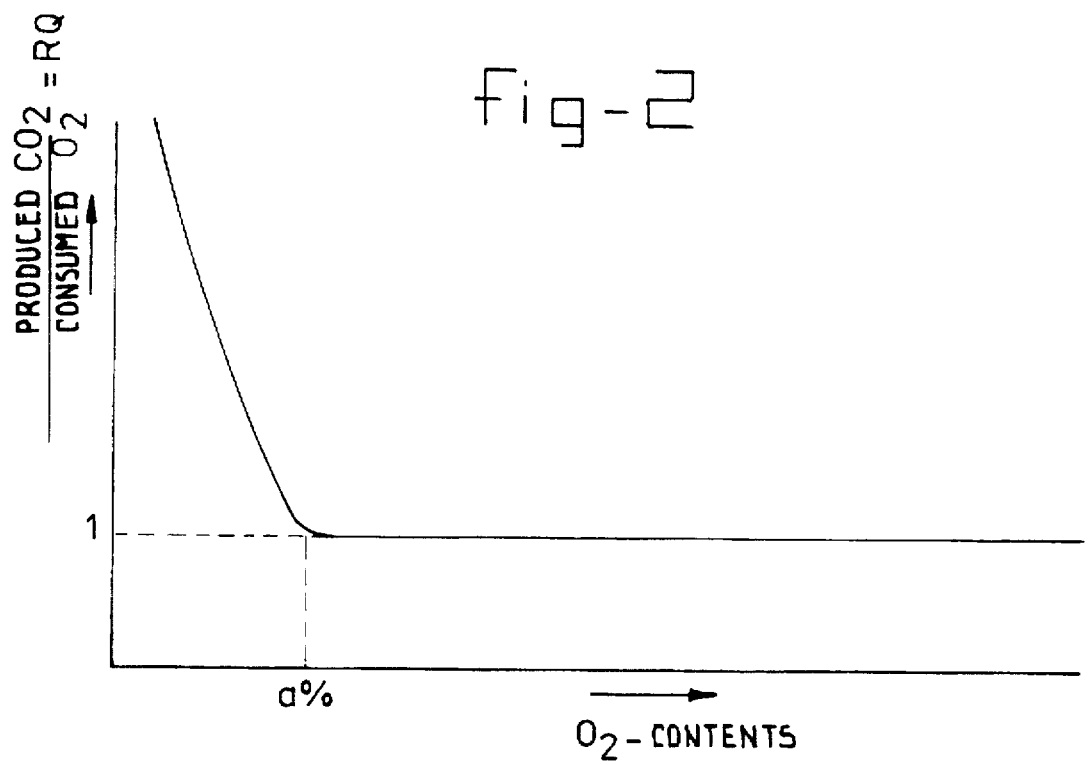
FIG. 2 shows the relation between the oxygen tension and the respiration quotient RQ, which is the ratio between the produced $CO_2$ and the consumed $O_2$.

FIG. 2 illustrates schematically the relation between the oxygen contents, shown along the horizontal axis and the respiration quotient $CO_2/O_2$, shown along the vertical axis. As appears from FIG. 2 the respiration quotient $CO_2/O_2$ remains constant and is approximately equal to 1 for all $O_2$-contents above a certain percentage a %. Beneath said percentage a % fermentation will occur and the respiration quotient $CO_2/O_2$ will rise sharply. The percentage a % is dependent on the type of the products to be stored and can be different for apples, pears, lettuce, cabbage, flowers, cheeses etc. The above-described control will now strive to maintain the oxygen contents at approximately a %.

In stead of an indirect measurement of metabolites, which are formed during the fermentation it is also possible to measure these metabolites directly. In that case the system has to comprise a sensor, for instance 16c, which is suitable for detecting ethanol or another sensor, for instance 16n, which is suitable for detecting lactate. As long as the respective sensor does not detect ethanol or lactate, then the $O_2$-content within the storage room 10 is gradually decreased. However, as soon as a measurable amount of ethanol or lactate is detected, then a small amount of $O_2$ is injected into the storage room so that the $O_2$-content shows a small increase. If this is sufficient to bring the ethanol or lactate contents back to an unmeasurable level, then thereafter gradually the $O_2$-content can be decreased until again a measurable amount of lactate or ethanol can be detected, etc.

Figure 3:
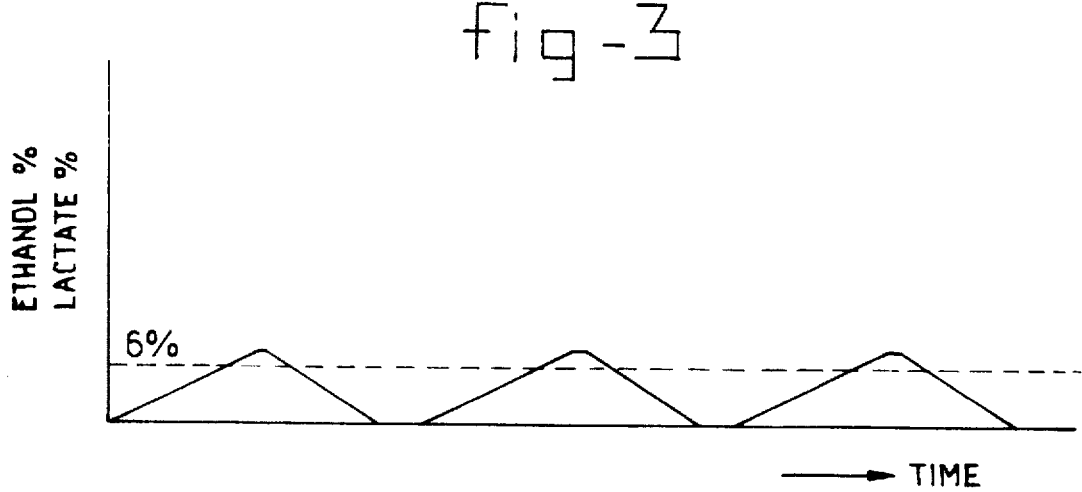
FIG. 3 illustrates the control behaviour of a system according to the invention with reference to a diagram in which the ethanol—or lactate content in the air is shown as function of time.

FIG. 3 illustrates schematically the variation in the contents of ethanol or lactate (shown along the vertical axis as function of time). A small amount of ethanol or lactate will be formed until a minimum measurable limit value, indicated by the dashed line, equal to b % will be exceeded. If this minimum measurable limit value is reached, then the various means around the storage room will be controlled such that the oxygen content will show a small increase to stop the fermentation process so that the lactate or ethanol contents will go down again to zero. Thereafter the whole cycle starts again.

Practical tests have proven that such a control method will lead to a very long storage life of the products present in the storage room.

I claim:

1. System for controlling the air composition within a storage room, the system comprising:
   a storage room for breathing vegetable products;
   means operatively associated to the storage room for controlling the oxygen content of the atmosphere in the storage room;
   first sensor means operatively associated to the storage room for sensing the air composition in the storage room;
   second sensor means operatively associated to the storage room for determining development of metabolites in the vegetable products at transfer from normal breathing to fermentation; and
   a processor including means for receiving signals sensed by the first and second sensor means, said processor including means for supplying control signals to the means for controlling the oxygen content, whereby the vegetable products are stored in an air composition in which the oxygen content is as low as possible.

2. System according to claim 1, wherein the first sensor means include sensors for measuring the oxygen content and the carbon dioxide content of the atmosphere within the storage room, said processor including means for calculating a ratio between carbon dioxide produced by the vegetable products and consumed oxygen, whereby the processor operates to decrease the oxygen content in the storage room as long as the calculated ratio is approximately equal to 1, and to increase the oxygen content when the calculated ratio is greater than 1.

3. System according to claim 1, wherein the second sensor means include a sensor for measuring the amount of ethanol in the air composition, whereby the processor operates to decrease the oxygen content in the storage room as long as the measured amount of ethanol in the air composition is negligible, and to increase the oxygen content when the measured amount of ethanol exceeds a predetermined threshold value.

4. System according to claim 1, wherein the second sensing means include a sensor for measuring the amount of lactate in the air composition, whereby the processor operates to decrease the oxygen content in the storage room as long as the measured amount of lactate in the air composition is negligible, and to increase the oxygen content when the measured amount of lactate exceeds a predetermined threshold value.

5. System according to claim 1, wherein the means for controlling the oxygen content of the atmosphere in the storage room comprise a nitrogen source, a carbon dioxide source, an oxygen source, and means for removing carbon dioxide.

* * * * *